US011637951B2

(12) United States Patent
Voss

(10) Patent No.: US 11,637,951 B2
(45) Date of Patent: Apr. 25, 2023

(54) REMOTE CONTROL DEVICE FOR A MOTION PICTURE CAMERA AND MARKING RING FOR A REMOTE CONTROL DEVICE

(71) Applicant: Arnold & Richter Cine Technik GmbH & Co. Betriebs KG, Munich (DE)

(72) Inventor: Hendrik Voss, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 17/308,292

(22) Filed: May 5, 2021

(65) Prior Publication Data

US 2021/0352204 A1 Nov. 11, 2021

(30) Foreign Application Priority Data

May 7, 2020 (DE) .......................... 102020112458.9

(51) Int. Cl.
*H04N 5/232* (2006.01)
*G03B 7/08* (2021.01)
(Continued)

(52) U.S. Cl.
CPC ........... *H04N 5/23203* (2013.01); *G02B 7/08* (2013.01); *H04N 5/23216* (2013.01)

(58) Field of Classification Search
CPC .. H04N 5/23203; H04N 5/23216; G02B 7/08; G03B 17/18; G03B 7/10; G03B 17/56; G03B 3/12
(Continued)

(56) References Cited

U.S. PATENT DOCUMENTS 6,724,429 B2 4/2004 Shore et al.
8,068,168 B2 11/2011 Haubmann
(Continued)

FOREIGN PATENT DOCUMENTS

DE 4219331 A1 12/1993
DE 19629484 A1 1/1998
(Continued)

OTHER PUBLICATIONS

German Search Report dated Oct. 1, 2021 in connection with German Patent Application No. 21172267.3.
(Continued)

*Primary Examiner* — Usman A Khan
(74) *Attorney, Agent, or Firm* — Amster, Rothstein & Ebenstein LLP

(57) ABSTRACT

A remote control device for generating setting signals for a lens setting motor of a motion picture camera comprises a base part and an operating element rotatable relative to the base part for setting control commands for the lens setting motor; a position encoder for detecting a respective rotational position of the operating element and generating corresponding position signals; an evaluation and control device that is configured to determine setting signals for the lens setting motor in dependence on the position signals in accordance with a mapping rule; and an output device for transmitting the setting signals to the motion picture camera. In this respect, the mapping rule corresponds to at least one mathematical functional relationship and the remote control device has an input device via which the mathematical functional relationship can be configured by user input. A marking ring for a remote control device has a memory in which a readable coding is stored.

17 Claims, 8 Drawing Sheets

Figure 1:
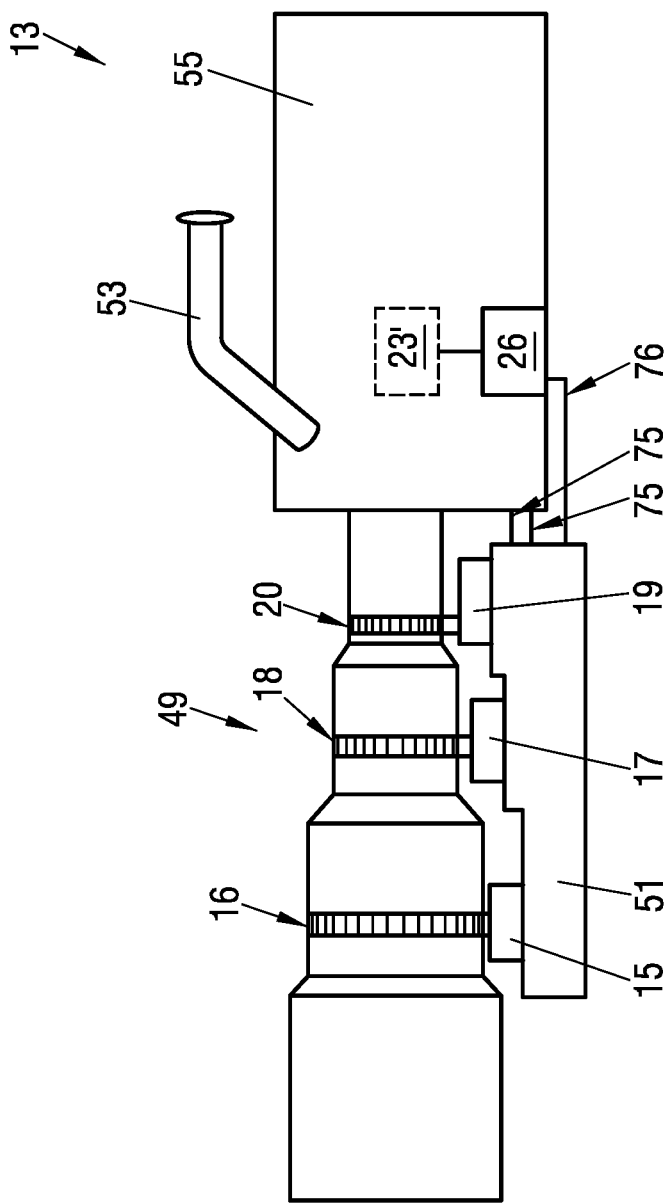

(51) Int. Cl.
*G03B 13/34* (2021.01)
*G02B 7/08* (2021.01)

(58) Field of Classification Search
USPC .................................................. 348/211.7
See application file for complete search history.

(56) References Cited

U.S. PATENT DOCUMENTS

| | | | |
|---|---|---|---|
| 8,718,462 | B2 | 5/2014 | Voss |
| 2003/0025802 | A1 | 2/2003 | Mayer, Jr. |
| 2005/0117897 | A1* | 6/2005 | Funahashi .............. G03B 17/08 396/27 |
| 2009/0231732 | A1* | 9/2009 | Sasaki .................... G02B 7/102 359/701 |
| 2012/0019702 | A1 | 1/2012 | Richter |
| 2013/0175132 | A1 | 7/2013 | Battlogg |
| 2013/0182137 | A1* | 7/2013 | Voss .................. H04N 5/23203 348/333.02 |
| 2016/0116824 | A1* | 4/2016 | Okawa ..................... G03B 3/10 396/133 |

FOREIGN PATENT DOCUMENTS

| | | |
|---|---|---|
| DE | 202013101874 U1 | 5/2013 |
| DE | 102011121021 A1 | 6/2013 |
| DE | 102012215861 A1 | 3/2014 |
| DE | 102017128393 A1 | 6/2019 |
| DE | 102018103092 A1 | 8/2019 |
| EP | 0 574 105 A1 | 12/1993 |
| EP | 2 338 085 B1 | 6/2011 |
| EP | 2 605 064 A2 | 6/2013 |
| GB | 2 413 644 A | 11/2005 |
| WO | 02/097528 A1 | 12/2002 |
| WO | 2010046237 A1 | 4/2010 |

OTHER PUBLICATIONS

German Search Report dated Nov. 3, 2020 in connection with German Patent Application No. 102020112458.9.

* cited by examiner

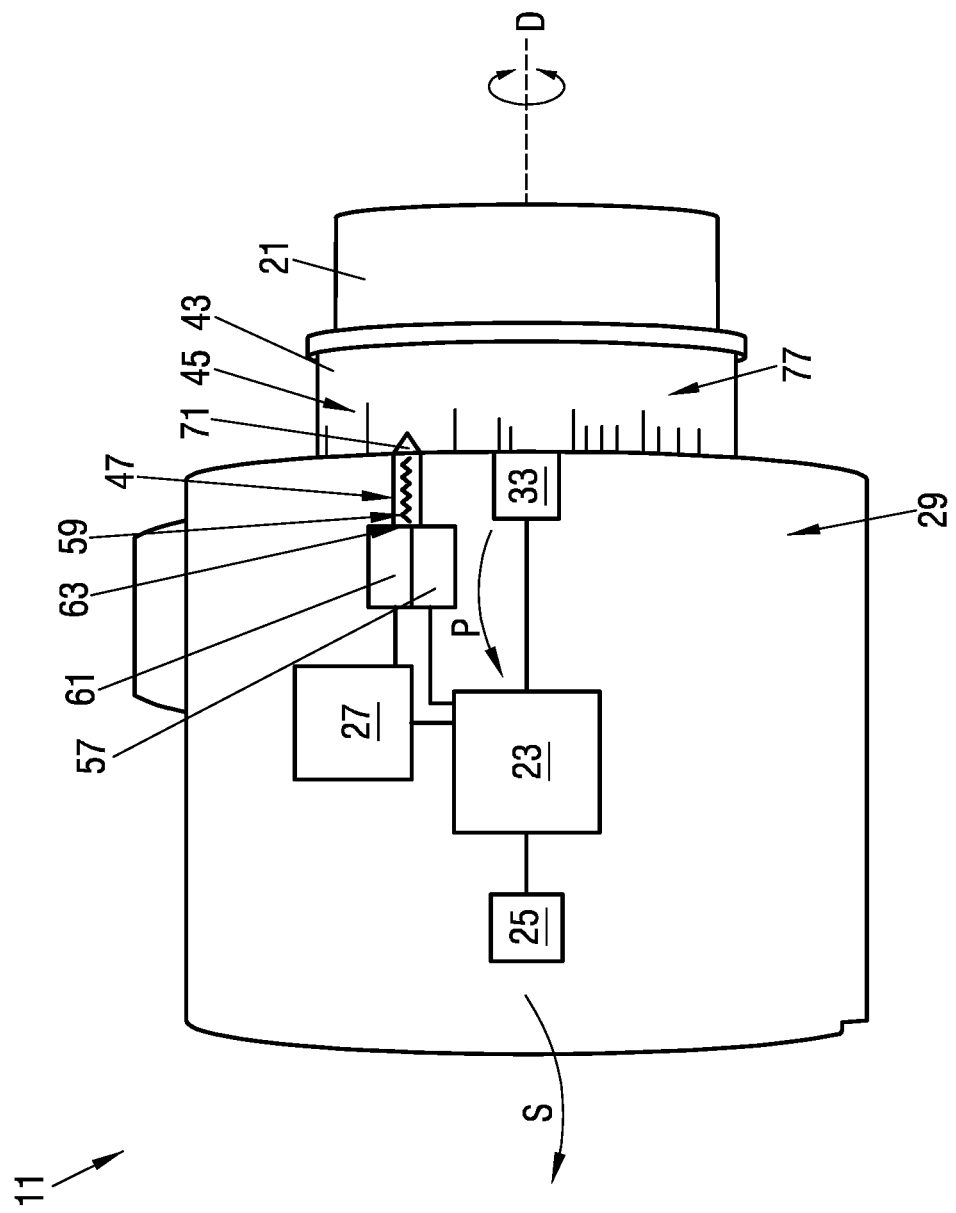

REMOTE CONTROL DEVICE FOR A MOTION PICTURE CAMERA AND MARKING RING FOR A REMOTE CONTROL DEVICE

The invention relates to a remote control device for generating setting signals for a lens setting motor of a motion picture camera, said remote control device comprising an operating unit that has a base part, an operating element rotatable relative to the base part about an axis of rotation for setting control commands for the lens setting motor, and a position encoder that is configured to detect a respective rotational position of the operating element relative to the base part and to generate corresponding position signals. The position signals ultimately serve for a corresponding control of the lens setting motor.

An electronic motion picture camera typically comprises an integrated optical system (camera objective, camera lens) or a lens mount to be able to selectively connect a respective interchangeable lens (interchangeable objective) that is adapted to specific recording situations. To be able to record the images captured by means of the optical system, an electronic image sensor for generating image signals from incident light and an image signal processing device for converting the image signals into a digital image data stream are usually provided.

A remote control device may in this respect be provided to be able to control an electronic motion picture camera (in particular a video camera) or a conventional motion picture camera (in particular a film camera) to record moving image sequences and/or to be able to set recording parameters or change them during a recording. A cameraman guiding the motion picture camera thereby only has to ensure the correct and possibly varying alignment of the camera for recording a desired image section, while the corresponding setting of the recording parameters may be taken over by a further person, a camera assistant, or a focus puller. For example, provision may be made to adapt the frame rate, the shutter speed, the aperture (f-stop), the focus distance or the focus, or the focal length (zoom factor) of the camera lens in a remote-controlled manner and in particular in a sequence during a recording previously agreed between the cameraman and the user of the remote control device.

The setting of parameters of the camera, and in particular of the aperture, the focus distance and the focal length, may take place via respective lens setting motors that may be integrated into the camera lens or that may typically be arranged as a separate, external unit outside the camera lens. Such a lens setting motor may be connected to a rotatable lens ring of the camera lens so that the respective parameter may be changed by rotating the lens ring by means of the lens setting motor. Thus, a remote-controlled setting of the recording parameters may take place through the transmission of setting signals to the respective lens setting motor by means of a remote control device in order to transfer the associated lens ring to a desired rotational position. Such a remote control device is, for example, known from DE 196 29 484 A1 and WO 2010/046237 A1. Furthermore, DE 42 19 331 A1, for example, shows a remote control device for setting different recording parameters before and in particular during a moving image recording by controlling respective lens setting motors.

To be able to select a control command for a lens setting motor for setting a specific parameter value, the operating units of such remote control devices frequently have an operating element that is rotatable relative to a base part and whose rotational position determines the respective control command. Accordingly, the associated setting signal for the lens setting motor is to be determined and generated from the rotational position of the operating element by the remote control device, for which purpose an association of the rotational positions of the operating element, which are detected by means of a position encoder and indicated by respective position signals, with the respective setting signals is required. A setting signal may in this respect in particular designate that rotational position of a lens ring which sets the parameter to be adapted, for example a focus distance, to the desired value and thus satisfies the control command. The respective control command may thus in particular correspond to a desired value to which the parameter influenced by the lens ring is to be set and the associated setting signal for the lens setting motor effects the implementation of the respective control command.

The mapping of the setting signals to respective position signals may in this respect take place on the basis of a mapping rule, frequently designated as mapping, that may be stored within the remote control device, in particular in the operating unit or in a unit that is separate therefrom and that is associated with the motion picture camera or the camera lens (including the motion picture camera itself). The remote control device may have an evaluation and control device (again integrated into the operating unit or separate therefrom) that is configured to determine the setting signals for the lens setting motor of the associated motion picture camera in dependence on the position signals of the position encoder in accordance with such a mapping rule. For this purpose, the mapping rule may be read and/or calculated by the evaluation and control device.

In order, in turn, to indicate the mapping of the set rotational positions of the operating element to respective control commands or to actually set values of the parameter to a user of the remote control device, marking rings that are rotationally fixedly connected or connectable to the operating element may be provided. They may bear a visible marking such as a scale of the values of the focus distance so that the effect resulting from a set rotational position may always be indicated to a user. In addition, the operating unit may also have an electronic display device to display set control commands and/or actually set values of the respective recording parameter.

The setting of a focus distance in particular frequently has a 1/x dependence on the rotational position of a lens ring so that the actually set focus distance is inversely proportional to the rotational position of the lens ring (e.g. focus distance [m]=360°/x; thus focus distance infinite for rotational position 0°; focus distance at close range limit 1 m for rotational position 360°). In such cases, such a 1/x dependence of the focus distance on the rotational position of the operating element of the remote control device is usually also desired. A rotation of the operating element may thus be translated directly (1:1) into a rotation of the lens ring so that the operation of the remote control device may be performed intuitively and substantially agrees with a direct operation of the lens ring. The mapping rule for mapping setting signals for the lens setting motor to position signals of the position encoder may in this respect correspond to a direct forwarding of the position signals in order to set the lens ring to a rotational position corresponding to that of the operating element. Linear mapping rules may also be provided, for example, to be able to map unequal value ranges for the position signals or rotational positions of the operating element and for the setting signals or rotational positions of a lens ring to one another.

However, it may be desired in certain recording situations or in certain scenes to deviate from a pure translation of the rotational position of the operating element into a rotational position of a respective lens ring in order, for example, to exclude a close range of the lens that is anyway not used and to be able to make settings of the focus distance only in a focal range relevant to the scene through rotations of the operating element. Therefore, linear mapping rules may also be prescribed that, for example, map a rotational position of the lens ring to be set, which corresponds to a focus distance deviating from the close range limit, to a minimum rotational position of the operating element. Due to such linear mapping rules, in addition to the described offset from the close range limit, a compression or a stretching of the 1/x dependence between the rotational position of the operating element and the value of the set parameter (e.g. focus distance) may also take place.

To be able to indicate such different mapping rules to a user, different ones of said marking rings may be provided. In this respect, a remote control device may have a selection menu by means of which a user may select the respective coupled marking ring from a selection of available marking rings in order to display the mapping rule to be used to the evaluation and control device.

While the mentioned setting possibilities indeed enable certain adaptations of the remote control device, they remain little customizable and, for example, limited by the number of stored marking rings. A user also first has to select the respective coupled marking ring in a time-consuming manner to be able to use the mapping rule resulting from its marking.

Furthermore, moving image recordings may in particular prove to be difficult during which a focus distance has to be changed slowly and continuously in order, for example, to follow an object that is slowly moving away from the motion picture camera. In particular if a relatively large focus distance is already set, the described 1/x dependence of the focus distance on the rotational position of the operating element may result in settings that are difficult to control and in relatively large changes of the focus distance with only small changes of the rotational position of the operating element. A continuous tracking of an object may also be difficult with a 1/x dependence of the focus distance on the rotational position of the operating element since equidistant changes of the distance of the object from the camera require different changes of the rotational position of the operating element in dependence on the position of the object.

A further problem with known remote control devices is that they do not easily enable an automatic detection of application-specific operational data such as of an individualized mapping rule or of a camera object used. The user-specific storage of such operating data is also not always possible in a satisfactory manner.

It is therefore an object of the invention to provide a remote control device for controlling a lens setting motor of a motion picture camera that enables a more flexible, simple, and fast adaptation to respective recording situations.

This object is satisfied in accordance with a first aspect of the invention by a remote control device having the features of claim 1 and in particular in that the remote control device has an evaluation and control device that is configured to determine setting signals for the lens setting motor in dependence on the position signals of the position encoder in accordance with a mapping rule, wherein the mapping rule corresponds to at least one mathematical functional relationship; and in that the remote control device has an input device via which the mathematical functional relationship of the mapping rule may be configured by user input.

The mapping rule or the mapping in this respect defines the mapping of different values of the position signal generated by means of the position encoder to corresponding values of the setting signal for the lens setting motor. The position signal may in this respect in particular indicate a respective rotational position of the operating element relative to the base part, while the value of the setting signal may correspond to a rotational position of an associated lens ring into which the lens ring is to be brought by means of the associated lens setting motor. Thus, respective value ranges may be predefined for the position signals and the setting signals, with the mapping rule defining a mapping of values from the value range of the position signal to values from the value range of the setting signal and/or vice versa. The value range of the position signal, but also the value range of the setting signal, may in this respect in particular comprise rotational positions from 0° to 360°.

Since the mapping rule corresponds to at least one mathematical functional relationship, a clear, calculable, and thereby adaptable mapping of position signals to respective setting signals may be specified. The mapping rule may in this respect in particular correspond to a continuous monotonic mathematical function so that a continuous rotation of the operating element results in a continuous increase or decrease of the parameter to be set and no jumps in the setting occur.

The equipping of the remote control device (in particular of the operating unit) with an input device now enables a user to configure the mapping rule in an individual and variable manner. For example, a user may set the mathematical functional relationship such that the mapping rule for mapping position signals to setting signals results in a linear relationship between rotations of the operating element and the actual setting of the parameter value. With respect to a focus distance to be set, it may be achieved by such a setting that, with rotational position changes of the operating element that are equal in magnitude, equidistant changes of the focus distance take place instead of the usual 1/x dependence in order, for example, to be able to make small-step adaptations of the focus distance at least in a certain range for a precise tracking of an object. Compared to a conventional linear conversion of the position signal or of the rotational position of the operating element into the setting signal for the lens setting motor or the rotational position of a lens ring, a 1/x dependence may accordingly in particular be configurable as a mapping rule by user input so that, in the case of a 1/x dependence of the parameter to be set (e.g. focus distance) on the rotational position of the lens ring, a linear dependence of the parameter to be set on the rotational position of the operating element relative to the base part may be achieved.

For this purpose, the mapping rule may in particular be configurable such that equidistant rotational positions of the operating element have a 1/x relationship or generally a non-linear relationship with the rotational positions of a lens ring to be set. If the camera lens therefore has a 1/x dependence or another non-linear dependence of the parameter to be set on the rotational position of the lens ring, this non-linear dependence may thus selectively be set in the remote control device as a mapping rule so that rotational position changes of the operating element of the same magnitude bring about equidistant changes of the camera lens parameter.

The mathematical functional relationship may in particular be flexibly adaptable for respective sections or value ranges so that a linear relationship of a respective rotational position change with the camera lens parameter to be set, for example a focus distance or a focal length, may be selected between a first rotational position and a second rotational position of the operating element, for example. In contrast, the conventional 1/x dependence may be maintained outside the range between the first rotational position and the second rotational position. To configure the mapping rule, the user may in this respect in particular set respective setting signals to be mapped to the first rotational position and to the second rotational position of the operating element and may select a linear relationship between the rotational positions of the operating element and the parameter to be set. The evaluation and control device or the input device may be configured to determine the mapping rule for the selected value range on the basis of the input value pairs and the selected functional relationship. Furthermore, the evaluation and control device or the input device may be configured to determine the mapping rule outside the selected value range such that the mapping rule overall corresponds to a monotonic continuous mathematical function that is to be sectionally defined in such a case. For this purpose, the gradient and an offset of a linear mapping of setting signals to position signals that is provided outside the selected value range may be adapted to the set value pairs.

For example, it may be achieved by such a range-wise setting of the mapping rule that a continuous and easy-to-perform rotation of the operating element results in a previously defined, non-continuous setting of a parameter, in particular of a focus distance. Thus, due to a continuous rotation of the operating element, first a comparatively pronounced increase of the focus distance may, for example, take place on the basis of the conventional 1/x dependence, thereupon a desired slow change between the selected first rotational position and the selected second rotational position may take place, whereupon a more pronounced increase of the focus distance may again take place on the basis of the conventional 1/x dependence for further rotational positions.

To be able to configure the mathematical functional relationship, provision may in particular be made that the remote control device may be brought into a configuration mode in which the mapping rule may be configured by means of the input device. For this purpose, the operating unit may, for example, have at least one button, a slide control, or a touch-sensitive display device (touchscreen) to be able to select the configuration mode and make settings. In such a configuration mode, setting possibilities for the mathematical functional relationship, which the user may select by actuating buttons, slide controls or a touch-sensitive display device, may be displayed by means of a display device, for example. Provision may in this respect in particular be made that a user may input at least one start value and the command for creating such a mapping rule that a linear relationship between the rotational position of the operating element and the respective parameter to be set is generated for rotational positions from this start value onward. In addition, an end value or that rotational position up to which the linear relationship is to exist may be selected, for example. Alternatively thereto, when only the start value is input, the linear relationship between the rotational position and the parameter of the motion picture camera to be set may be determined automatically up to the maximum rotational position of the operating element, in particular 360°, and the mapping rule for mapping setting signals to position signals may be determined accordingly.

The described configuration of the mapping rule for mapping position signals to setting signals by means of the input device generally does not require a user to immediately or directly make adaptations to this mapping rule. Provision may rather be made that possibilities for adapting the mapping of rotational positions of the operating element to respective values of the parameter of the camera to be set are indicated to a user in the configuration mode. However, by selecting and configuring this mapping of rotational positions to parameter values, the user may also indirectly configure the mapping rule for mapping setting signals to position signals, wherein the adaptation or calculation of the actual mathematical functional relationship may take place by means of the input device or the evaluation and control device. This may make a simple and intuitive adaptation of the mapping rule possible for a user without him having to know and adapt the details of the processes taking place within the remote control device.

The evaluation and control device may generally comprise one or more of the following devices: an integrated circuit (IC); a microprocessor; a central processing unit (CPU); an application-specific integrated circuit (ASIC); or a field programmable gate array (FPGA).

The setting of values via the input device of the remote control device may generally comprise that a value is determined at the input device by the user input and that the input device uses or transmits this value, for example to the evaluation and control device.

Different embodiments of the first aspect of the invention can be seen from the dependent claims, from the description, and from the drawings.

The configuration mode of the remote control device described above may in this respect generally be provided to make the settings described with respect to the different embodiments.

In some embodiments, a relationship corresponding to a 1/x function and/or another non-linear relationship between values of the position signal of the position encoder and associated values of the setting signal for the lens setting motor may be settable via the input device for at least one value range of the position signals or for at least one value range of the setting signals. Due to a setting of such a 1/x relationship between the position signal and the setting signal in a certain value range, a linear relationship between the position signal or the rotational position of the operating element represented by said position signal relative to the base part, on the one hand, and the actual value of the set parameter of the motion picture camera or of the camera lens, on the other hand, may in particular be achieved even if, as is conventional, there is a 1/x relationship between the rotational position of a respective lens ring and the parameter value. The setting of another, non-linear relationship between values of the position signal and associated values of the setting signal may also enable a desired adaptation of the mapping rule and in particular a linear relationship between rotational positions of the operating element and values of the parameter provided that there is a relationship between the parameter value and the setting signals that differs from a 1/x dependence.

A value range of the position signals, in particular a first and a second rotational position of the operating element, may in this respect be selectable to which the selected relationship is to apply. Furthermore, such a setting may also take place through a selection of a value range of the setting signals that may, for example, be indirectly represented at a display device by a value range of the parameter to be set. A range of focus distances, for which a linear change of the focus distance is to take place on a rotation of the operating element, may thereby be defined in a simple manner, for example. Alternatively thereto, the selected functional relationship may also be settable for the total value range of the position signals and of the setting signals so that only a selection of the functional relationship takes place.

In some embodiments, a start value of the at least one value range of the position signals or of the at least one value range of the setting signals may be settable via the input device. Alternatively or additionally, an end value of the at least one value range of the position signals or of the at least one value range of the setting signals may be settable via the input device. The user may thus configure the value range in which a mathematical functional relationship deviating from a conventional mapping rule is to be set and may define the respective mathematical function for this value range.

In some embodiments, different mathematical functional relationships may be settable by user input via the input device for different value ranges of the position signal or for different value ranges of the setting signals.

For example, relationships between the position signal and the setting signal that correspond to 1/x functions may be set for two different value ranges of the position signals in order to obtain a linear relationship between the rotational position and the adapted parameter of the motion picture camera for rotational positions of the operating element in the respective value ranges. For example, a conventional 1/x relationship may continue to exist between these value ranges. Furthermore, the limits of the value ranges may, for example, be input as pairs of position signals and setting signals to be mapped and a functional relationship desired for this value range may be settable, wherein the input device or the evaluation and control device may be configured to determine the gradient of the set mathematical functional relationship resulting from this input and to create the mapping rule. Furthermore, the input device or the evaluation and control device may be configured to determine the mapping rule between two individually configured value ranges such that the mapping rule corresponds to a continuous monotonic mathematical function over the total value range of the position signals.

In some embodiments, the mapping rule may correspond to a continuous monotonic mathematical function having at least one parameter, wherein the parameter may be set by means of the input device. A mapping rule that may be configured in this manner may provide a particularly simple setting possibility for the user.

In some embodiments, at least one of the following mathematical functional relationships may be settable for the mapping rule by means of the input device: a power function, a linear function, a polynomial function, a rational function, an exponential function, and/or a logarithmic function. The settable functions may in particular be displayed by means of a display device in a configuration mode of the remote control device, wherein a user may, for example, choose between the available functions by actuating buttons of the remote control device or of a touch-sensitive display device. In turn, an indirect representation of the mapping rule for mapping position signals to setting signals may be provided by an indication of the resulting relationship between rotational positions of the operating element and set values of the parameter of the motion picture camera.

Furthermore, in some embodiments, a value range of the position signals or a value range of the setting signals may also be settable by means of the input device for the application of the selected mathematical functional relationship. This may enable a flexible setting or configuration of the mapping rule, wherein respective and possibly mutually different functional relationships may be set for any desired value ranges of the position signals or of the setting signals, in particular for any desired ranges of rotational positions of the operating element.

In some embodiments, a minimum value of the setting signal and/or a maximum value of the setting signal may be continuously or quasi-continuously—and thus very flexibly—changeable by user input via the input device. The value range limits of the setting signal for the lens setting motor may thereby also be variably definable without a user, for example, being limited to a selection from only a few predetermined values. The input device and/or the evaluation and control device may in this respect be configured to adapt a mathematical functional relationship set by the user or a preset mathematical functional relationship such that the selected minimum value and/or maximum value of the setting signal is/are associated with a minimum value and/or maximum value of the position signal or with a minimum position and/or maximum position of the operating element. A parameter range that is provided by a respective motion picture camera or its lens may thus be flexibly limited and in a manner adapted to the respective recording. In turn, the value range limits of the setting signal may be indicated and selected indirectly via the respective limits of the parameter of the motion picture camera to be set that result therefrom.

In particular due to the possibility of being able to adapt a minimum value of the setting signal continuously or quasi-continuously, the mapping rule may be configured in a simple manner such that any desired close range of a lens may, for example, be excluded. The evaluation and control device or the input device may in this respect be configured to automatically adapt a selected mathematical functional relationship or a preset mapping rule, in particular a linear mapping rule, for mapping setting signals to position signals to the selected minimum value of the setting signal. In the case of a conventional linear mapping or a linear mapping rule for mapping setting signals to position signals, a compression or a stretching of the mapping of set parameter values to rotational positions of the operating element may in particular be achieved by the selection of a minimum setting signal. This compression or stretching as well as the close range to be excluded may be set as desired by a continuous or quasi-continuous change of the minimum setting signal so that a user is, for example, no longer limited by the number of stored marking rings in such a setting.

In some embodiments, a respective desired setting signal may be able to be input by means of the input device for a plurality of different rotational positions of the operating element so that a plurality of pairs of position signals and desired setting signals are defined, wherein the evaluation and control device may be configured to determine the mapping rule in accordance with the defined pairs of position signals and desired setting signals. For example, the evaluation and control device may be configured to determine the mapping rule by linear interpolation between the value pairs or fits of a polynomial. Complex mapping rules or functional developments may hereby also be defined in a simple manner by user input.

In some embodiments, the evaluation and control device may be configured to determine the mapping rule by regression or interpolation from values and/or parameters that are input via the input device. For example, in a configuration mode of the remote control device, value pairs of position signals and setting signals as well as mathematical functions provided for respective value ranges may be selectable or settable by a user in this respect, wherein the evaluation and control device may be configured to determine the mapping rule on the basis of this information.

The evaluation and control device may be configured to determine the setting signals for the lens setting motor by calculation or by looking up in a look-up table in dependence on the position signals. The evaluation and control device may consequently be configured to calculate the setting signals mapped to respective position signals directly on the basis of the mathematical functional relationship or to look them up in a look-up table (LUT) that is created in accordance with the mathematical functional relationship. In this respect, provision may be made that such a look-up table only provides supporting values based on the mathematical functional relationship and the evaluation and control device is configured to determine intermediate values by interpolation or regression.

In some embodiments, the remote control device may have a memory for storing the mapping rule. In this respect, such a memory may be provided for permanently storing the mapping rule so that the mapping rule may, for example, be automatically called up again on a further use of the remote control device. Alternatively thereto, the memory may be provided for temporarily storing the mapping rule as a working memory of the evaluation and control device. The memory may be provided at the operating unit or—in a modular design of the remote control device—at a unit separate therefrom, in particular at the motion picture camera.

The input device of the remote control device may be integrated into the operating unit or—in a modular design of the remote control device—may be provided at a unit separate therefrom, in particular at the motion picture camera.

The input device may comprise at least one of the following components: the rotatable operating element of the operating unit; the position encoder; at least one button of the operating unit or of the motion picture camera; a display device of the operating unit or of the motion picture camera; and/or a touch-sensitive display device of the operating unit or of the motion picture camera.

For example, in a configuration mode of the remote control device, the operating element of the operating unit may serve to select the respective settings for the mathematical functional relationship through rotation. In this respect, the input device may also comprise the position encoder to be able to detect the rotational position of the operating element in the configuration mode and to be able to associate it with respective settings of the mathematical functional relationship. Furthermore, the remote control device, in particular the operating unit, may have at least one button by means of which settings may be made. The remote control device, in particular the operating unit, may in particular have a display device to display the configuration possibilities of the mathematical functional relationship in the configuration mode to a user. A touch-sensitive display device, in particular a touch screen, may in this respect make it possible to make settings directly and comfortably. The evaluation and control device may also form a part of the input device and may, for example, be configured to determine the mapping rule based on input values or on a selection made by a user and thereby to complete the configuration of the mapping rule.

In some embodiments, the input device may comprise a radio receiver for receiving an individual mapping rule from a mobile communication device of a user. This may enable a flexible configuration of the mapping rule in an application (app) of a mobile communication device, in particular a mobile radio device, and its wireless transmission to the remote control device. A configuration at a PC or laptop may also be provided, wherein the wireless transmission of the mapping rule may, for example, take place via a Bluetooth or Wifi connection.

The remote control device in accordance with the embodiments mentioned above and also in the following and further aspects of the invention may have an electronic display device at which parameter values (e.g. focus values) may be presented that correspond to the control commands for the lens setting motor that are set or are to be set by means of the operating element. The parameter values presented may be desired values and/or actual values. The parameter values may be presented as numerical values and/or graphically. The electronic presentation may also comprise additional information such as a depth of focus. The presentation of the parameter values may be variable relative to the base part in dependence on the rotational position of the operating element and may in particular be continuously adapted. The electronic display device may in particular be arranged at the base part of the remote control device.

In some embodiments, the remote control device may comprise a marking ring that may be rotationally fixedly coupled to the operating element of the operating unit and that is provided to mark the settable control commands, wherein the input device of the remote control device may be configured to read a desired mapping rule from a memory of the coupled marking ring and to transmit it to the evaluation and control device. This makes it possible to apply the mapping rule displayed at the marking ring directly and without further settings of the user on an actuation of the operating element. For this purpose, the input device may have a reading device, which is in particular provided at the operating unit, for the memory of the coupled marking ring. The reading device of the input device may for example comprise a microcontroller that communicates directly with the memory or with an associated microcontroller of the coupled marking ring, particularly via suitable electrical contacts.

In some embodiments, the operating unit may comprise a writing device that is configured to write a mapping rule stored in the remote control device to the memory of the coupled marking ring. The transmission of a coding that represents the mapping rule, for example based on a parameterization, is sufficient for this writing of the mapping rule to the memory of the coupled marking ring. The writing device of the operating unit may for example comprise a microcontroller that communicates directly with the memory or with an associated microcontroller of the coupled marking ring, particularly via suitable electrical contacts. The writing device of the operating unit may in particular form a read/write device together with the input device to be able to both read and write to the memory of the marking ring. A mapping rule configured by user input may thereby be written to the memory of the coupled marking ring in a simple manner. An individually created mapping rule may thus also be transferred to another remote control device, namely by coupling the marking ring to the operating unit of the other remote control device and reading in the mapping rule, which is written to the memory of the marking ring, from the other remote control device.

The mapping, which results from the respective mapping rule, of position signals or of the rotational position of the operating element to control commands or values of the parameter to be set may be able to be applied, in particular able to be printed and/or adhesively bonded, to the marking ring. An individually configured mapping rule may thus be permanently stored in the memory of a coupled marking ring and the marking ring may be marked accordingly. On a coupling of the marking ring to the rotatable operating element of the operating unit, the individually configured mapping rule may be automatically read by the input device and transmitted to the evaluation and control device so that this mapping rule may be directly applied. An individually configured mapping rule may thereby be permanently and repeatedly used in a manner clearly marked by the marking ring without a repeat configuration being necessary. Furthermore, it is possible to directly apply individual mapping rules at different remote control devices, in particular also for rental devices, by coupling the marking ring storing the configured mapping rule.

In some embodiments, the evaluation and control device may be integrated into the operating unit of the remote control device (in particular into the base part). The determination of the setting signals for the lens setting motor in dependence on the position signals of the position encoder in accordance with the mapping rule thus takes place in the operating unit. In such embodiments, the operating unit may have an output device that is configured to transmit the setting signals for the lens setting motor directly or indirectly to the lens setting motor(s), in particular in a wireless or wired manner. The setting signals may be transmitted to a reception device of the motion picture camera that may in particular be provided in or at the camera body or in or at a lens ring drive unit of the motion picture camera. Such a lens ring drive unit may comprise one or more lens setting motor motor(s) and may be connected to the camera body of the motion picture camera in a mechanical and/or technical signal manner.

In contrast, the evaluation and control device may be formed separately from the operating unit in some embodiments—with a modular design of the remote control device. The evaluation and control device provided for the determination of the setting signals may be integrated into a separate unit. The separate unit may be the associated motion picture camera, wherein the evaluation and control device of the remote control device may in particular be provided in or at the camera body or in or at a lens ring drive unit of the motion picture camera. Such a lens ring drive unit may comprise one or more lens setting motor(s) and may be connected to the camera body of the motion picture camera in a mechanical and/or technical signal manner. The evaluation and control device of the remote control device may also be part of a higher-ranking control unit of the motion picture camera. In such embodiments, the operating unit may have an output device that is configured to transmit the position signals of the position encoder (directly or in a further processed form) to the evaluation and control device. The transmission of the position signals of the position encoder to the evaluation and control device may take place in a wireless or wired manner. The evaluation and control device may in turn be configured to transmit the determined setting signals directly or indirectly to the lens setting motor(s), wherein this may take place in a wireless or wired manner.

In this respect, the invention also relates to a camera system comprising a motion picture camera and a remote control device of said kind, wherein the evaluation and control device is integrated into the motion picture camera. Such a motion picture camera may, as initially mentioned, comprise an integrated optical system or a lens mount for an interchangeable lens; further an electronic image sensor for generating image signals from incident light; and an image signal processing device for converting the image signals into a digital image data stream.

The setting signal for the lens setting motor may generally represent a value to be set for a focus distance, for an aperture, or for a focal length of a lens of the motion picture camera.

The invention also relates to the use of a remote control device of said kind to configure a mathematical functional relationship of a mapping rule, which corresponds to a mapping of position signals of a position encoder of an operating unit to setting signals of a lens setting motor, by user input in the manner explained.

Said object is satisfied in accordance with a second aspect of the invention (alternatively or in addition to the first aspect of the invention) by a remote control device for a lens setting motor of a motion picture camera, said remote control device in particular being able to be configured in accordance with any one of the above-described embodiments of the first aspect of the invention and comprising an operating unit that has a base part, an operating element rotatable relative to the base part about an axis of rotation for setting control commands for the lens setting motor, and a position encoder that is configured to detect a respective rotational position of the operating element relative to the base part and to generate corresponding position signals, wherein the operating element is configured to receive a marking ring for marking the settable control commands in a rotationally fixed coupling, wherein the operating unit of the remote control device has a reading device that is configured to read a coding provided at a coupled marking ring.

The remote control device, and in particular the operating unit, may generally also have an evaluation and control device that is configured to determine the setting signals for the lens setting motor in dependence on the position signals in accordance with a mapping rule.

Since the operating element is configured to receive a marking ring, the set control commands or the set values of the associated parameter of the motion picture camera may be indicated to a user when the operating element is brought into a respective rotational position. The marking ring may in particular bear corresponding markings at its lateral surface (e.g. numerical values and/or scale bars).

Due to the design of the remote control device with a reading device for reading a coding of the marking ring, the marking ring may simultaneously be used as an extended information carrier to transmit an operating data set to the coupled operating unit, for example a piece of information on a desired or set operating mode. This operating data set may relate to the remote control device, and/or to the associated motion picture camera, and/or to the associated camera lens. In this way, an automatic acquisition of the operating data set (e.g. operating mode) may be effected due to the marking ring that is anyway used. Thus, the user does not have to manually input the respective operating mode and/or operating data set at the operating unit, but he can effect this by a simple coupling of the marking ring to the operating unit. It is hereby also achieved that a corresponding setting of the respective operating mode and/or operating data set is not forgotten. Since a marking ring is typically coordinated with a specific lens with respect to its marking, the respective coding of the marking ring may in particular relate to an associated lens (e.g. a mapping rule or "lens file", as further explained below).

In some embodiments, the reading device of the operating unit may be configured to read the coding of the marking ring through electrical contacting, through magnetic coupling, through electromagnetic signal transmission, or through electromechanical conversion. An electrical signal transmission or a resistance measurement may in particular be provided in the case of an electrical contacting. In this respect, a measured value of the electrical resistance may, for example, be associated with a respective marking ring so that the evaluation and control device may read the mapping rule associated with the detected marking ring from a memory. In the case of an electrical signal transmission, a larger number of values may be coded. A magnetic coupling or an electromagnetic signal transmission may also take place contactlessly (in particular by transmitting a radio signal, for example in accordance with a protocol in accordance with "near field communication", NFC). An electromechanical conversion may comprise scanning one of a plurality of predetermined shapes that bring about different electrical signals of the scanning device.

In some embodiments, the remote control device may comprise, in particular analogously to as already explained, a writing device that is configured to transmit a coding (e.g. a mapping rule or lens file) stored in the remote control device to a coupled marking ring. The writing device may in particular form a read/write device together with the reading device. The marking ring may thus be used as a writable storage medium.

The rotatable operating element of the operating unit may have a coupling device by which the marking ring may be rotationally fixedly coupled to the operating element, in particular in a force-transmitting and/or form-fitted manner. Furthermore, the relative rotational position between the marking ring and the operating element may be defined by the coupling device so that an agreement between the control commands marked by the marking ring and the corresponding rotational position of the operating element may be ensured.

As already explained, the remote control device may have an evaluation and control device that is configured to determine the setting signals for the lens setting motor in dependence on the position signals in accordance with a mapping rule, wherein the evaluation and control device is configured to determine the mapping rule by means of the coding read by the coupled marking ring. Due to the design of the remote control device with a reading device for reading a coding of the marking ring, that mapping rule which corresponds to the marking of the marking ring may be directly applied in a simple manner. The mapping rule represented by the read coding thus corresponds to the mapping of rotational positions of the operating element to control commands or desired parameter values of the associated camera lens.

For this purpose, the evaluation and control device of the remote control device may be configured to determine, from the read coding, the mapping rule for mapping setting signals for the lens setting motor to position signals or rotational positions of the operating element. Consequently, a user does not first have to select the respective marking ring or a corresponding mapping rule in an input menu of the remote control device, but may directly start with the control of the motion picture camera.

Such a reading of a coding, from which the mapping rule corresponding to the marking ring may be automatically determined, may enable a control of the motion picture camera adapted to respective moving image recordings and may facilitate and accelerate the control of the remote control device. Furthermore, operating errors may be avoided more easily. In this respect, a large number of marking rings having different mapping rules and readable codings may in particular be used to achieve a control that is as variable as possible.

The coding may in this respect generally represent or reflect the mapping rule or serve to identify the marking ring. In this respect, the mapping rule may already be directly present by reading the coding, while the coding may, for example, also transmit a calculation instruction or a look-up instruction for looking up in a look-up table (LUT) for the evaluation and control device.

In some embodiments, the remote control device may have a memory for storing a plurality of mapping rules, wherein the evaluation and control device may be configured to select one of the stored plurality of mapping rules in dependence on the read coding. For example, the respective coupled marking ring known to the remote control device may be marked by the coding, wherein the evaluation and control device may be configured to select the mapping rule corresponding to the coupled marking ring from the memory or a look-up table.

Furthermore, the evaluation and control device may be configured to use the read coding as a mapping rule or to convert it into a mapping rule. The coding may directly determine the mapping rule to be used so that the reading device may, for example, transmit a look-up table (LUT), in which the mapping rule is contained, to the evaluation and control device by reading the coding. The coding may also, for example, describe respective parameters by means of which the evaluation and control device may determine or calculate the mapping rule or the respective mathematical functional relationship.

In some embodiments, the coding that represents a mapping rule may be read or written in the form of electrical signals.

Furthermore, the remote control device may, analogously to as already explained, have an input device for changing and/or configuring the mapping rule. The mapping rule may thereby be individually adapted by a user, as described above, for specific situations and may in particular be transmitted to a coupled marking ring so that, on a subsequent or repeat use of this marking ring, the desired mapping rule may be automatically read by the reading device and determined by the evaluation and control device.

In some embodiments of the second aspect of the invention, the evaluation and control device may be integrated into the operating unit. The determination of the setting signals for the lens setting motor in dependence on the position signals of the position encoder in accordance with the mapping rule thus takes place in the operating unit. In such embodiments, the operating unit may have an output device to output the setting signals for the lens setting motor, as explained for the first aspect of the invention.

In contrast, the evaluation and control device may be formed separately from the operating unit in some embodiments of the second aspect of the invention—with a modular design of the remote control device. The evaluation and control device provided for the determination of the setting signals may be integrated into a separate unit, in particular into the associated motion picture camera, as explained for the first aspect of the invention.

In this respect, the invention also relates to a camera system comprising a motion picture camera and a remote control device of said kind in accordance with the second aspect of the invention, wherein the evaluation and control device is integrated into the motion picture camera. Such a motion picture camera may, as initially mentioned, comprise an integrated optical system or a lens mount for an interchangeable lens; further an electronic image sensor for generating image signals from incident light; and an image signal processing device for converting the image signals into a digital image data stream.

Alternatively or in addition to the explained mapping rule, the coding read from the marking ring may represent a so-called lens file. In some embodiments, the operating unit may have an evaluation and control device (in particular the already mentioned evaluation and control device) and an electronic display device, wherein the evaluation and control device is configured to display predetermined representation values at the display device, wherein the representation values correspond to respective setting values of an associated lens of the motion picture camera and are predetermined by the read coding. The predetermined representation values may in particular correspond to markings that are applied (e.g. engraved) at a lens ring of the associated lens. The user may thus observe the representation values known to him from the respective lens ring and their position also at the electronic display device of the operating unit while he varies the respective parameter (e.g. focus distance) by means of the rotatable operating element. It is advantageous here that the predetermined representation values may be automatically read in and presented at the display device solely by coupling the marking ring to the operating unit.

The predetermined representation values represented by the coding may in particular comprise numerical values. The evaluation and control device may be configured to display additional information, in particular a depth of focus, at the display device. This additional information may be directly represented by the read coding or may be calculated by the evaluation and control device, in particular using further information provided that are, for example, provided by the motion picture camera or by the associated camera lens (e.g. value of the aperture).

Furthermore, the evaluation and control device may be configured to define a variable position of the displayed representation values at the display device in dependence on the setting values of the lens, wherein the setting values of the lens may be desired values or actual values of a recording parameter of the lens. Thus, the position of the representation values represented at the display device, in particular relative to a setting value marker, may be dynamically adapted to the parameter values to be set or that are set, as this corresponds to the rotational position of the rotatable operating element. The position signals of the position encoder or values derived therefrom may in particular be used as desired values. Position measurement values (in particular so-called encoder values) of the corresponding lens setting motor may be used as actual values. For this purpose, the operating unit may have a reception device to directly or indirectly receive the position measurement values from the respective lens setting motor (in particular via the motion picture camera or an associated lens ring drive unit). Desired values and actual values of the respective recording parameter may also be simultaneously displayed at the display device.

The remote control device in accordance with the second aspect of the invention may have said marking ring having a readable coding.

The invention also relates to the use of a remote control device of said kind to read a coding provided or stored at a coupled marking ring.

The invention further relates to a marking ring for marking control commands for a lens setting motor of a motion picture camera, in particular for use in a remote control device as described above for different embodiments. The marking ring is rotationally fixedly couplable to a rotatable operating element of a remote control device for setting control commands for the lens setting motor, wherein the marking ring bears a marking of the settable control commands or may be provided with such a marking. Furthermore, the marking ring has a memory in which a coding is stored or may be stored, wherein the memory has an interface or is connected to an interface via which the coding may be read from the memory and/or may be written to the memory.

The marking ring thus has a memory in which a coding, in particular a data set, is stored or may be stored. The coding may in particular be used by the coupled remote control device for a control or presentation of information in connection with the motion picture camera and/or with the lens setting motor (e.g. for a control of the lens setting motor or for a presentation of suitable setting values at a display device of the remote control device). The coding may in particular comprise a coding of a mapping rule and/or a value association, as will also be explained in the following for different embodiments.

The coding or the data set may in particular be able to be stored, read and/or written in electronic form. The memory integrated into the marking ring enables a use of the marking ring as a storage medium, in particular in the event of an individualization of the marking ring or of the coupled remote control device by the user. The memory integrated into the marking ring may assist an automatic configuration of the coupled remote control device.

The marking ring may in particular be hollow cylindrical, disk-shaped, or hollow cylindrical with a disk-shaped flange section and may be pluggable onto the rotatable operating element. In this respect, the marking may in particular be formed by a lettering at a visible outer side of the marking ring and may, for example, indicate scale markings (e.g. line patterns) and associated control commands or numerical values to which a parameter of a motion picture camera (including the lens) is to be set in a respective rotational position of the operating element.

The interface may be directly or indirectly connected to the memory. The coding may in particular be read in the form of an electrical signal via the interface of the memory.

Due to the memory that enables a reading of stored information via the interface, a coding corresponding to the marking ring may be transmitted to an associated remote control device on the coupling of the marking ring to an operating element and may in particular be automatically applied on the setting of setting signals for a lens setting motor. The adaptation of the remote control device to a specific application and/or to a specific camera lens may thereby be simplified. Alternatively or additionally, a coding of a coupled remote control device may be read into or written to the memory of the marking ring via the interface. The marking ring may thus be used as a mobile storage medium in order, for example, to store a specific (in particular an individually configured) mapping rule and to later transfer it to a (any other) coupled remote control device.

In some embodiments, the interface of the memory may be configured to perform the coding through electrical contacting, through magnetic coupling, or through electromagnetic signal transmission.

The interface may in particular be configured to be electrically contacted by a reading device of the coupled remote control device. This may enable a direct reading of the coding and determination of the mapping rule on a coupling of the marking ring to the remote control device. An electromagnetic signal transmission, in contrast, may take place contactlessly (in particular by transmitting the coding in the form of a radio signal).

In some embodiments, the memory of the marking ring may be an electronic memory and may in particular be formed by a solid-state memory (e.g. EEPROM) or by a microchip (in particular having a non-volatile memory function). In accordance with a particularly simple embodiment, the memory may be formed by an electrical resistor.

The memory may be surrounded by a waterproof protective cover. This may prevent damage to the memory by entering water, wherein the protective cover may have an opening through which the interface may be contacted.

In some embodiments, the coding may represent an operating data set for the coupled remote control device, wherein the interface of the memory is configured to cooperate with a reading device of the coupled remote control device in order to read the coding from the memory.

In some embodiments, the marking of the marking ring may correspond to a mapping rule for mapping the control commands to respective rotational positions of the operating element, wherein the coding represents the mapping rule. As already explained, the mapping rule may in particular describe a dependence of the setting signals for a lens setting motor of the associated motion picture camera on position signals of a position encoder of the remote control device. The mapping rule itself or information on the marking ring used or on the mapping rule, on the basis of which the mapping rule may be determined, may be stored in the memory of the marking ring. For this purpose, a look-up table (LUT) that assigns corresponding mapping rules to respective marking rings may be stored in a remote control device, for example.

In some embodiments, the coding may represent a so-called lens file in the form of a set of representation values for an electronic representation of setting values of an associated camera lens. The coding may in particular represent a relationship between the setting values and the representation values. Alternatively or additionally, the coding may comprise predetermined representation values and/or additional information such as a depth of focus. As already explained in connection with the lens file, the operating unit of an associated remote control device may have an electronic display device at which predetermined representation values are displayed that correspond to respective setting values of an associated lens of the motion picture camera and that are predetermined by the coding read from the memory. The predetermined representation values may in particular correspond to markings that are applied (e.g. engraved) at a lens ring of the associated lens. The user may thus observe the representation values known to him from the respective lens ring and their position also at the electronic display device of the operating unit while he varies the respective parameter (e.g. focus distance) by means of the rotatable operating element. It is advantageous here that the predetermined representation values may be automatically read in and presented at the display device solely by coupling the marking ring to the operating unit.

The invention further relates to a remote control device as disclosed herein that has a marking ring of the kind described above.

The invention will be described in the following purely by way of example with reference to embodiments and to the drawings.

There are shown

Figure 2:
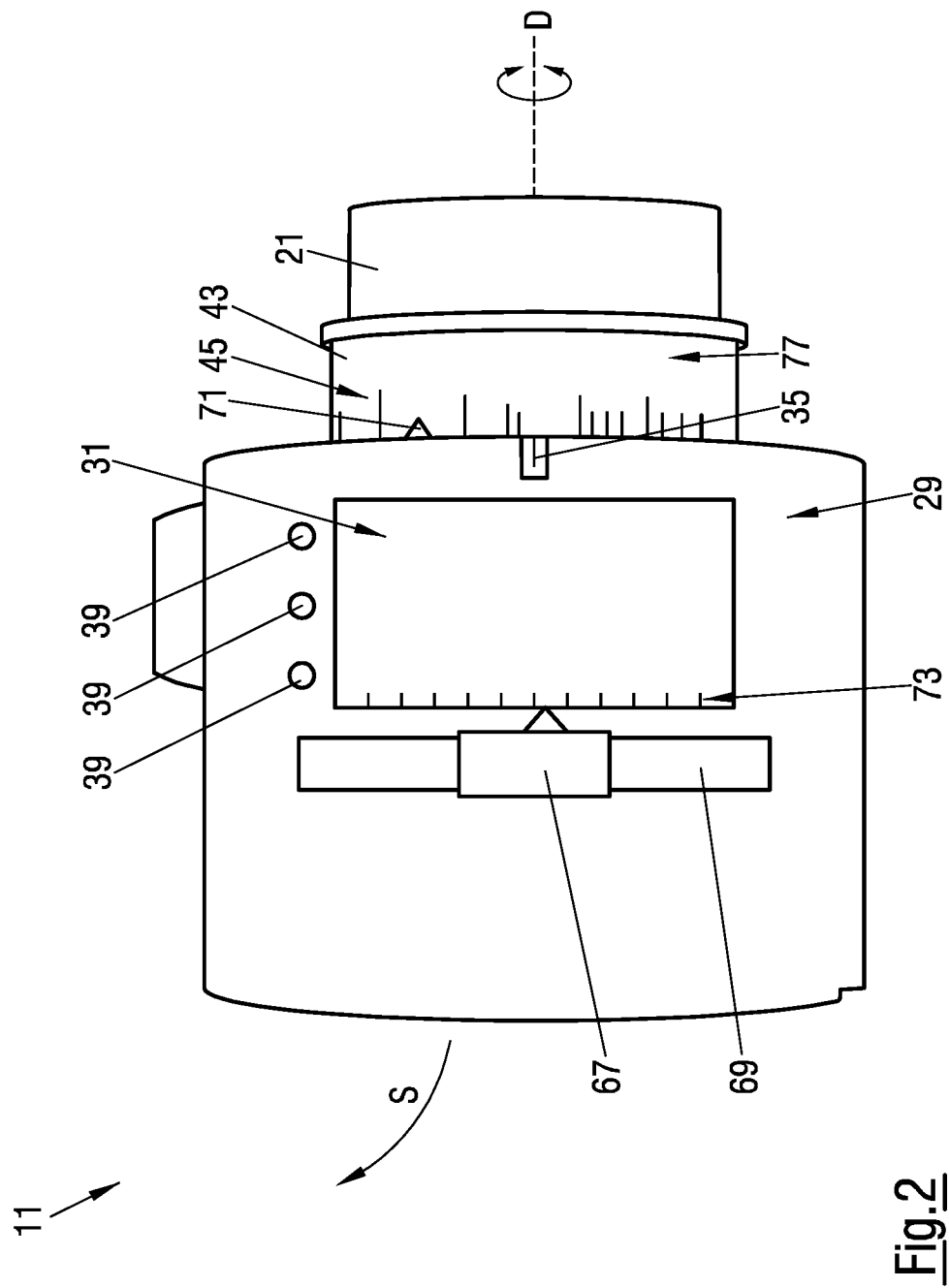
Figure 7A:
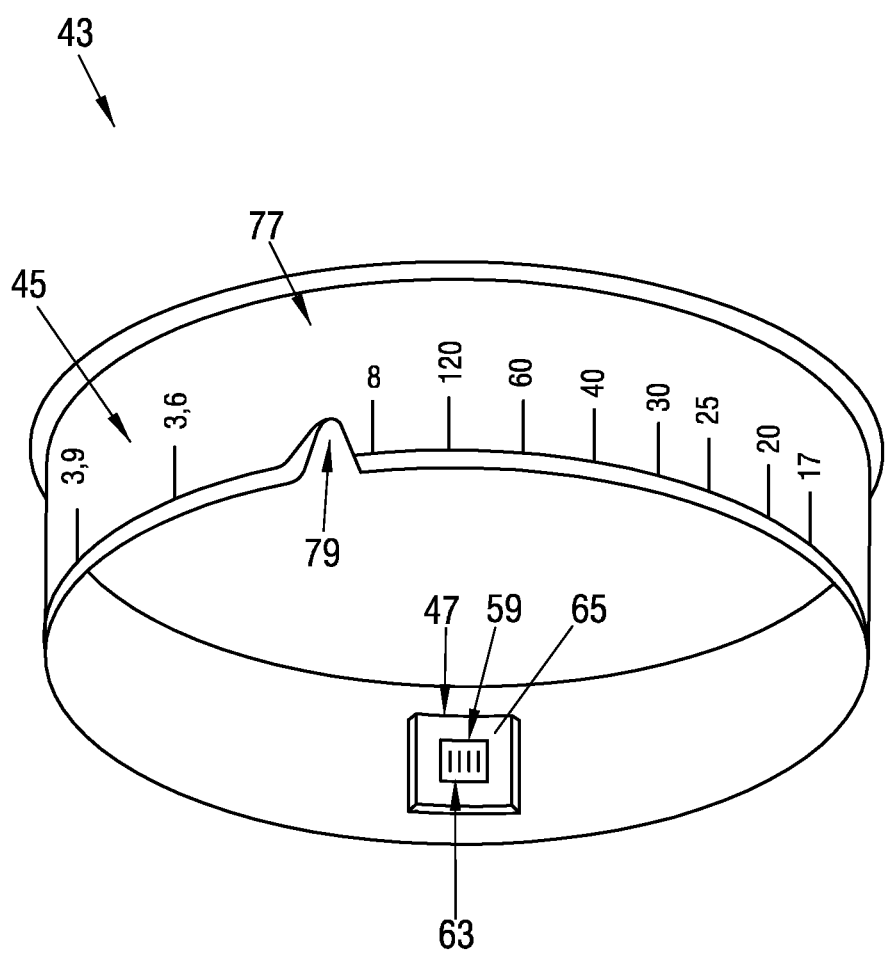
Figure 7B:
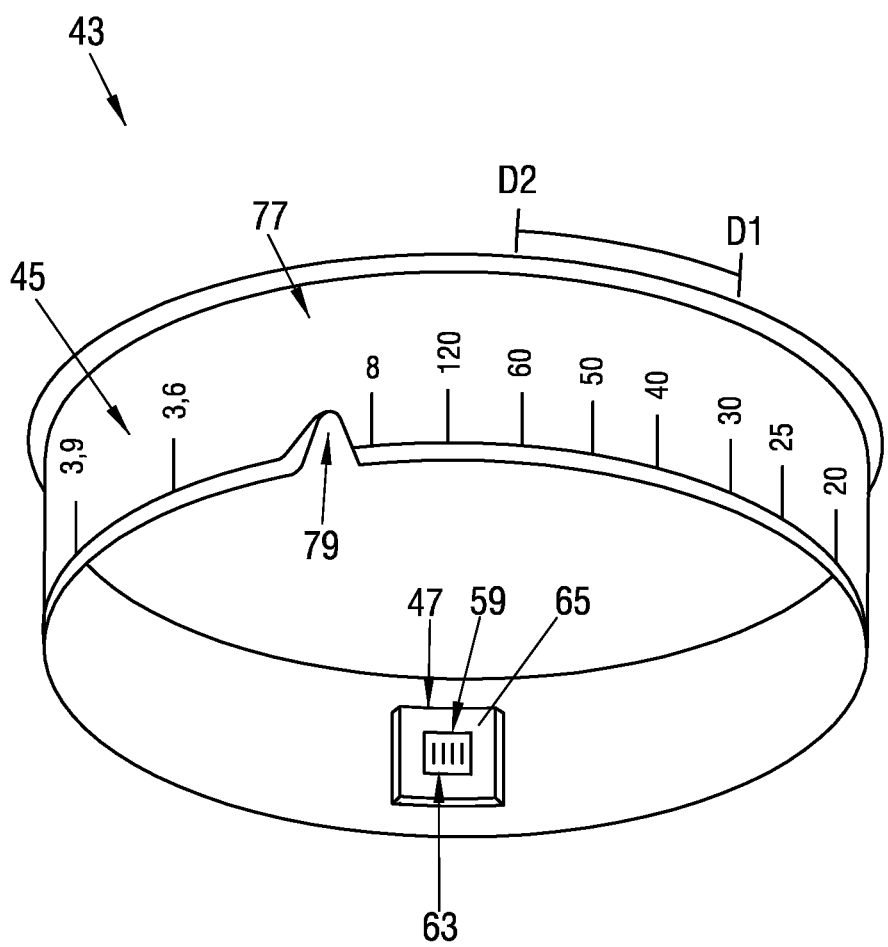

FIG. 1 a schematic representation of a motion picture camera having lens setting motors;

FIG. 2 a representation of a remote control device for generating setting signals for the lens setting motors of the motion picture camera;

FIGS. 3 to 6 respective schematic representations of possible embodiments of the remote control device; and FIGS. 7A and 7B respective representations of a marking ring for coupling to the remote control device.

FIG. 1 shows a motion picture camera 13 comprising a camera body 55 to which an interchangeable lens 49 is fastened. This interchangeable lens 49 has three lens rings 16, 18 and 20 by means of which respective parameters of the motion picture camera 13 (or of the lens 49) may be set. For example, the first lens ring 16 may be provided to adapt the focus distance of the interchangeable lens 49 through rotations, while the focal length may, for example, be settable by means of the second lens ring 18. The lens ring 20 may, for example, be provided to adapt the aperture. Respective lens setting motors 15, 17 and 19 are provided to be able to adjust the lens rings 16, 18 and 20. These setting motors 15, 17 and 19 are arranged at a lens ring drive unit 51 that is connected to the camera body 55 in a mechanical manner via two holding bars 75 and in a technical signal manner via a signal line 76.

To be able to check a respective image focused on by means of the interchangeable lens 49, and thus the correct alignment of the motion picture camera 13, a viewfinder 53 is further arranged at the camera body 55. Due to the design of the motion picture camera 13 with an interchangeable lens 49, different kinds of lenses and lens ring drive units coordinated therewith may in particular also be connected to the camera body 55. For example, respective ideally suited lenses may thus be variably connected to the camera body 55 in dependence on the scene to be recorded. Lenses having a fixed focal length may in particular also be provided in which only the focus distance and/or the aperture is/are settable via respective lens rings.

During a recording by means of such a motion picture camera 13, provision may frequently be made to perform the adaptation of said parameters by setting the lens rings 16, 18 and 20 in a remote-controlled manner so that a cameraman may focus solely on the correct alignment of the motion picture camera 13. In this respect, the setting of the parameters of the motion picture camera 13 may take place by a further person, in particular a camera assistant or a focus puller, by means of a remote control device via which the user may set setting signals S for the respective lens setting motors 15, 17 and 19 and may transmit them to the motion picture camera 13. A possible embodiment of such a remote control device for the motion picture camera 13 is shown in FIG. 2.

The remote control device shown in FIG. 2 comprises a portable operating unit 11. It has a base part 29 and an operating element 21 which is rotatable relative to the base part 29 about an axis of rotation D and by means of which control commands for the motion picture camera 13 or for at least one of the lens setting motors 15, 17 and 19 may be set. The control commands in this respect in particular correspond to a value to which the parameter influenced by the respective lens ring 16, 18 or 20 is to be set.

A marking ring 43, which is hollow cylindrical and which may be axially placed onto the operating element 21 with respect to the axis of rotation D, is rotationally fixedly connected to the operating element 21. At its outer side 77, the marking ring 43 bears a marking 45 in the form of a scale (scale markings and/or a scale of numerical values) at which the set control commands or values of the influenced parameter of the motion picture camera 13 may be read. To be able to indicate the set control command or the rotational position of the operating element 21, a setting value marker 35 is provided at the base part 29. The operating element 21 further has a coupling device 71 in the form of an elevated portion that engages into an associated cut-out 79 of the marking ring 43 (cf. also FIGS. 7A and 7B). This engagement of the coupling device 71 ensures the rotationally fixed coupling between the operating element 21 and the marking ring 43 at a predefined relative rotational position between the marking ring 43 and the operating element 21 in order to ensure a correct mapping of the control commands to rotational positions of the operating element 21.

To be able to further check or adapt the settings made by means of the operating unit 11, the base part 29 of the remote control device has an electronic display device 31. This display device 31 provides, by means of a display 73, information for a user that may, for example, relate to a further parameter of the motion picture camera 13 or to a selection possibility for setting the remote control device itself. Furthermore, a slide control 67 guided in a guide 69 is provided by means of which settings displayed by the display 73 may be selected, for example. Furthermore, the base part 29 has three buttons 39 to also be able to make settings at the remote control device itself or at the motion picture camera 13. For example, provision may be made to selectively switch the motion picture camera 13 on or off or to start or interrupt a recording by means of one of the buttons 39.

A mapping of control commands for the motion picture camera 13 or of parameter values of the motion picture camera 13 to rotational positions of the operating element 21 is defined by the already mentioned marking 45 of the marking ring 43 so that a user may easily check settings made. To be able to perform this mapping indicated to the user, setting signals S for the lens setting motors 15, 17 and 19, which satisfy the control commands and move the respective lens ring 16, 18 or 20 into the provided rotational position, have to be generated by means of the remote control device. These setting signals S thus also have to be mapped to respective rotational positions of the operating element 21 by means of a mapping rule.

The setting signals S may in this respect in particular represent rotational positions of the controlled lens ring 16, 18 or 20. As a rule, a rotation of one of the lens rings 16, 18 or 20 in this respect causes a change of the respective parameter, for example of a focus distance, in a 1/x dependence on the rotational position of the lens ring 16, 18 or 20. Accordingly, the marking 45 of the marking ring 43, as in particular shown in FIG. 7A, also usually reflects such a 1/x dependence so that a rotation of the operating element 21 substantially corresponds to a direct rotation at the respective lens rings 16, 18 or 20. Thus, the setting by means of the remote control device 11 does not result in substantial differences in comparison with a direct setting of the motion picture camera 13. In this respect, a simple linear relationship between a rotational position of the operating element 21 and the generated setting signal S is usually provided.

As FIGS. 3 to 6 show, the remote control device 11 generally comprises a position encoder 33 by means of which the rotational position of the operating element 21 relative to the base part 29 may be determined and a corresponding position signal P may be generated. The position encoder 33 may for example comprise a magnetic or optical sensor which detects a rotational position of a disc rotating together with the operating element 21. The position encoder 33 is connected to an evaluation and control device 23 to which the position signal P is transmitted. The evaluation and control device 23 is configured to determine a setting signal S, associated with the respective position signal P, for one of the lens setting motors 15, 17 or 19 by means of a mapping rule and is connected to an output device 25 to transmit the generated setting signal S to the motion picture camera 13 or the respective lens setting motor 15, 17 or 19. In the embodiments shown, the output device 25 is configured for a wireless transmission of the setting signal S, wherein a wired transmission may generally also be provided. A reception device 26 is provided at the motion picture camera 13 to receive the setting signal S and to transmit it to the lens setting motors 15, 17 or 19 (in particular via the signal line 76 and/or the lens ring drive unit 51).

Whereas the conventional mapping rule described above, which describes a linear mapping of setting signals S to position signals P, generally enables an intuitive operation of the motion picture camera 13 with a 1/x dependence of the set parameter on the rotational position of the operating element 21 similar to a direct operation at the lens rings 16, 18 or 20 themselves, a different mapping between the rotational positions of the operating element 21 and the set parameter values may be desired in certain situations or for certain recordings. Instead of the 1/x dependence, a linear relationship between the set parameter and the rotational position of the operating element 21 may in particular be desired by a user at least in a certain value range in order, for example, to be able to achieve slow and finely adjustable changes of a focus distance.

Figure 3:
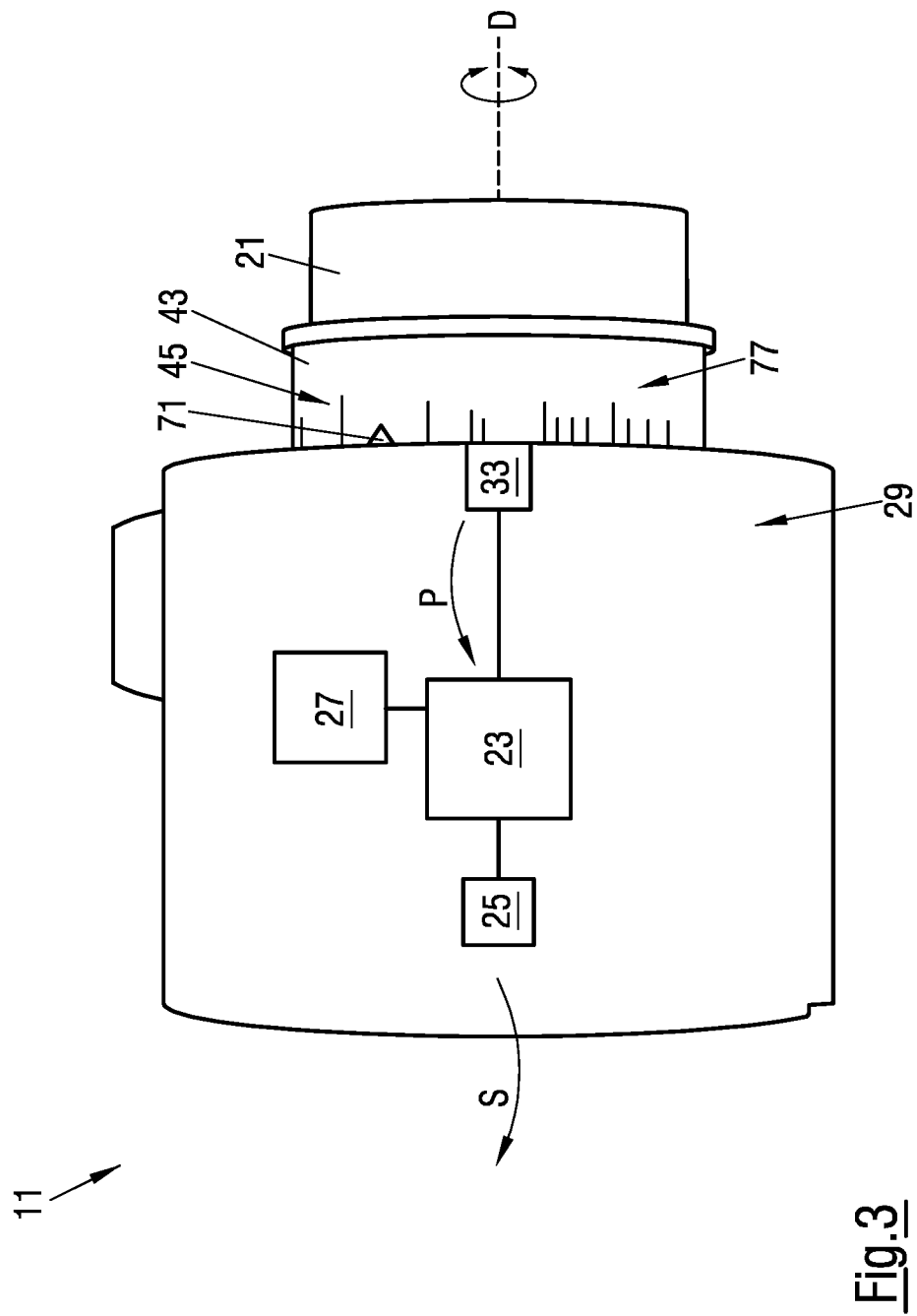

To be able to achieve an individual definition or adaptation of the mapping rule for the mapping of setting signals S to position signals P, an input device 27 is therefore provided in accordance with FIG. 3 by means of which the mapping rule may be configured by user input. In this respect, this mapping rule corresponds to at least one mathematical functional relationship. Different embodiments of the user interaction are possible for the input device 27.

To enable a configuration of the mapping rule, the input device 27 may in particular comprise the display device 31 shown in FIG. 2 that may display setting possibilities for configurations of the mathematical functional relationship in a configuration mode of the remote control device to a user. Furthermore, the display device 31 may be touch-sensitive so that a user may directly make settings at the display device 31 and may be visually guided in the process. The input device 27 may also be operable by means of a button or the buttons 39, the slide control 67 or, in the configuration mode, the operating element 21, wherein settings for configuring the mapping rule that are displayed at the display device 31 may, for example, be selected through rotations of the operating element 21 detected by the position encoder 33.

For example, a user of the remote control device may select a value range in which there should be a linear relationship between the rotational position of the operating element 21 and the actually set parameter value at the motion picture camera 13 (or at the lens 49). In this respect, the input device 27 itself or the evaluation and control device 23 may be configured to adapt the mapping rule for mapping setting signals S to position signals P such that there is ultimately a linear relationship between the position signals P and the set control commands or the influenced parameter of the motion picture camera 13. A 1/x dependence of the setting signal S on the position signal P may in this respect in particular be generated for said value range.

In addition to such a selection of a value range of the position signals P or setting signals S and the selection of a linear relationship in this value range between rotational positions of the operating element 21 and control commands for the motion picture camera 13, provision may also be made that a user merely selects start values of such value ranges and inputs or determines a mathematical functional relationship that is to apply to values larger or smaller than the start value. Furthermore, the user may input a plurality of value pairs of position signals P and setting signals S, wherein the evaluation and control device 23 may be configured to determine the mapping rule between these pairs by regression or interpolation by means of a selected or predefined function. Provision may also be made that a user may select different value ranges and, for these value ranges, respective functions which that may be different from one another. For example, a user may be presented with a selection of power functions, linear functions, polynomial functions, or exponential functions. The evaluation and control device 23 may in this respect be configured to connect value ranges such that the mapping rule is described by a continuous monotonic function.

Provision may generally be made that direct setting possibilities for the mapping rule between the position signals P and the setting signals S are displayed to a user by means of the display device 31, whereas it is also possible that a user selects and adapts a desired mapping between rotational positions of the operating element 21 and generated control commands. In this case, the input device 27 or the evaluation and control device 23 may automatically configure the mapping rule between the position signals P and the setting signals S that is thereby defined so that the user may ultimately indirectly also configure the mapping rule of setting signals S to position signals P by selecting the mapping of control commands to rotational positions of the operating element 21.

Figure 4:
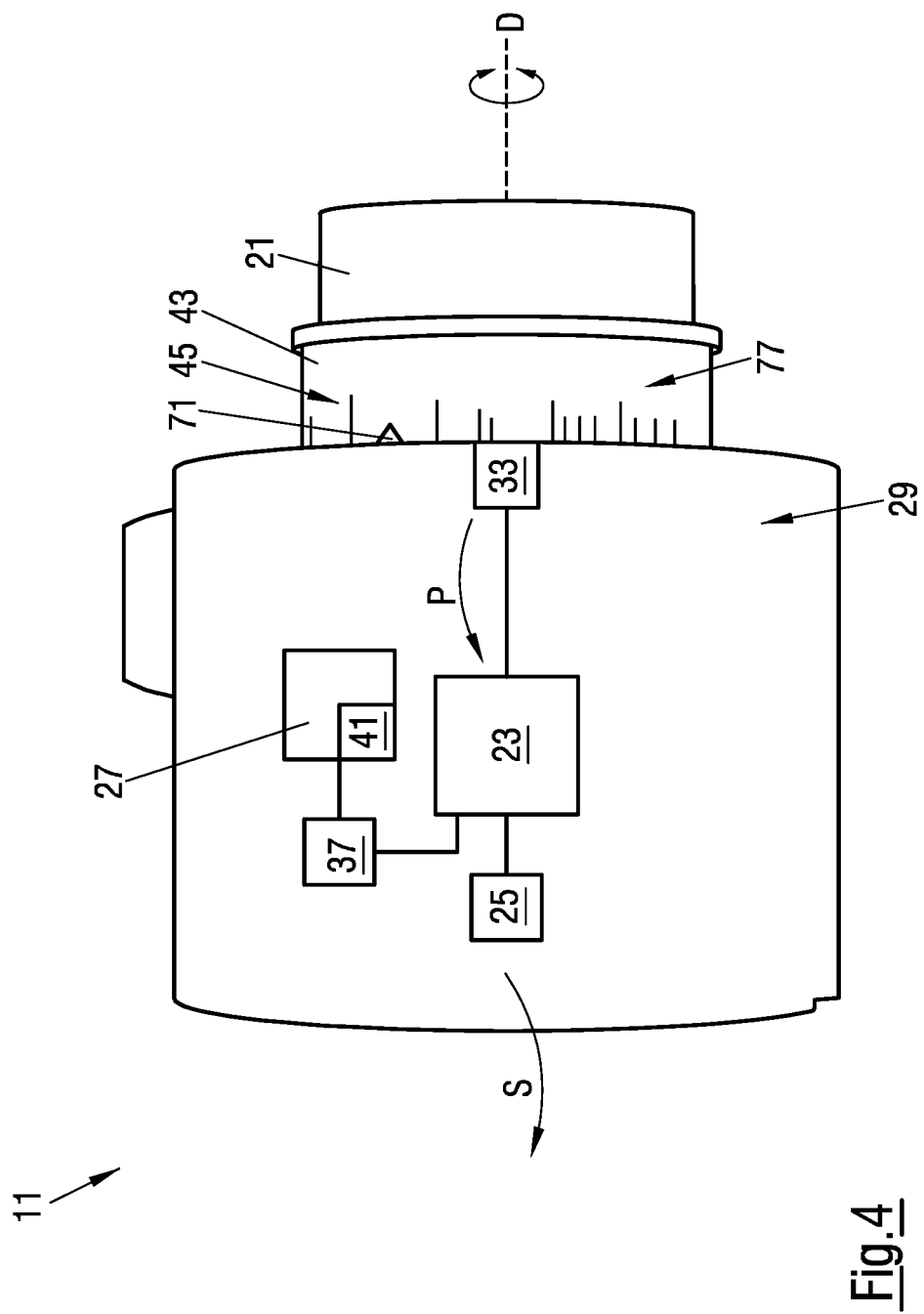

As FIG. 4 shows, the input device 27 may further comprise a radio receiver 41 by means of which an individual mapping rule may be received by a mobile communication device of the user. A user may thereby comfortably create the mapping rule at a mobile device and transmit it to the remote control device.

While the evaluation and control device 23 may generally be configured to calculate the mapping rule or the setting signal S mapped to a respective position signal P, provision may also be made that the evaluation and control device looks up the mapping rule in a look-up table (LUT). For this purpose, the remote control device may in particular in the base part 19 of the operating unit 11 have a memory 37 in which the mapping rule may, for example, be permanently stored to be able to directly use the configured mapping rule on a subsequent repeat use of the remote control device (cf. FIG. 4). Alternatively, the memory 37 may only store the mapping rule temporarily and may serve as a working memory of the evaluation and control device 23.

In the embodiment of the remote control device shown in FIGS. 3 and 4, the evaluation and control device 23 is integrated into the base part 19 of the operating unit 11. Alternatively thereto, a modular design of the remote control device may also be provided in which the evaluation and control device is formed separately from the operating unit 11 and is arranged in or at the motion picture camera 13. Thus, the determination of the setting signals S in dependence on the position signals P in accordance with the mapping rule takes place on the part of the motion picture camera 13. This is illustrated in FIG. 1 by the evaluation and control device 23' (shown by dashed lines) that receives the position signals from the output device 25 of the operating unit 11 via the reception device 26. The evaluation and control device 23' transmits the setting signals S via the signal line 76 to the lens ring drive unit 51 or to the lens setting motors 15, 17 and 19. The evaluation and control device 23' could, for example, also be integrated into the lens ring drive unit 51.

In a corresponding manner, the input device 27 of the remote control device or a part thereof could also be arranged in or at the motion picture camera 13.

Figure 5:
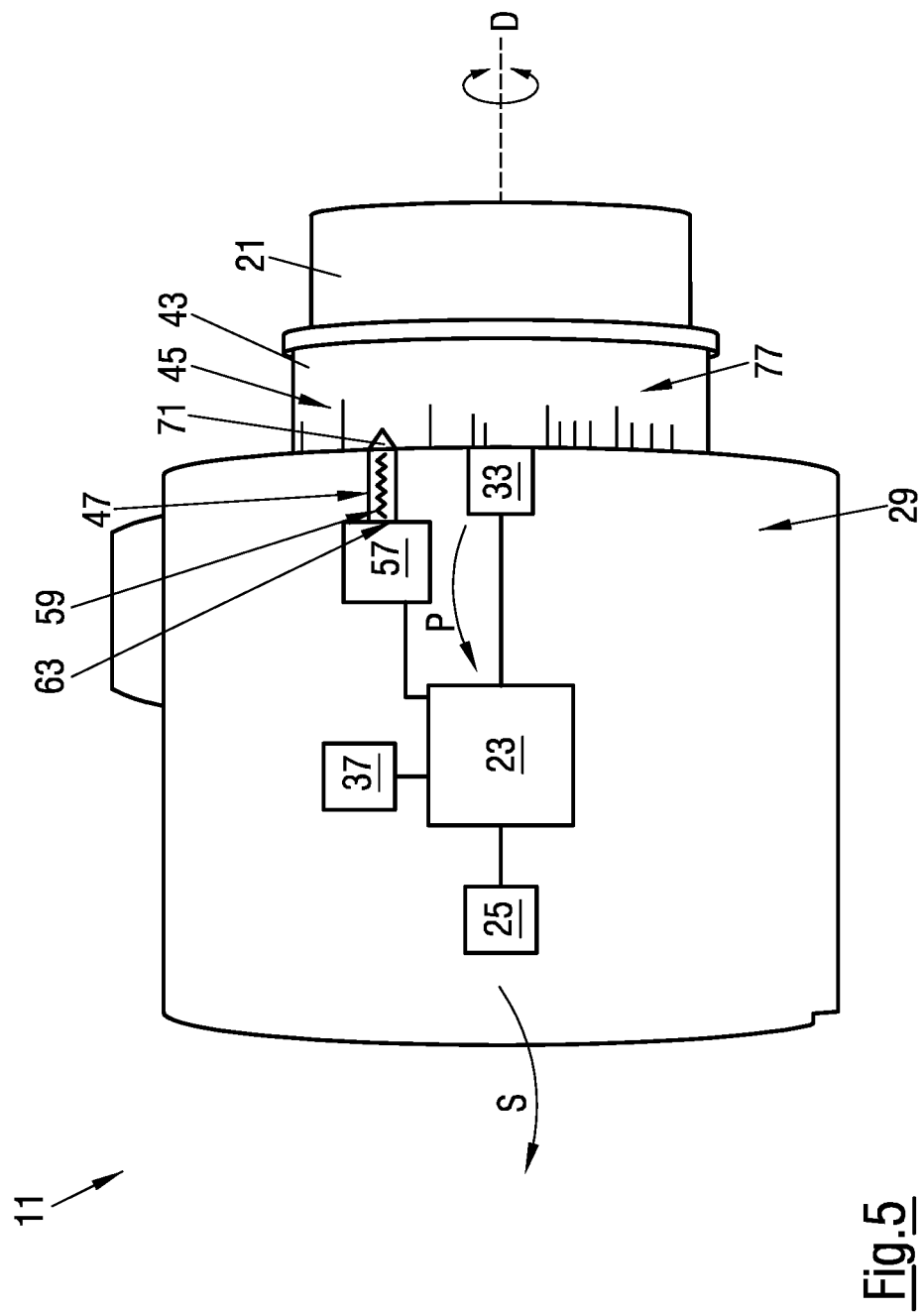

FIG. 5 shows a further possibility of making the use of the remote control device variable. In this respect, an input device 27 for configuring the mapping rule is not necessarily provided, but the operating unit 11 of the remote control device has a reading device 57 that is configured to read a memory 47 of the marking ring 43 via an interface 63 provided for this purpose (cf. also FIGS. 7A and 7B). A coding 59 is written to the memory 47 and may be read by the reading device 57, for example, through electrical contacting, through magnetic coupling, or through electromechanical signal transmission. The stored coding 59 may generally represent an operating data set, for example, information on a desired or set operating mode of the remote control device, of the motion picture camera 13, or of the camera lens 49.

In accordance with an embodiment, the reading device 57 may further be connected to the evaluation and control device 23 that may be configured to determine, from the determined coding 59, the mapping rule defined by the marking 45 of the marking ring 43 for mapping setting signals S to position signals P and—as explained—to generate the setting signals S on the basis of this mapping rule.

In this respect, the coding 59 may, for example, represent the mapping rule itself so that the evaluation and control device 23 may gather the mapping rule directly from the memory 47 of the marking ring 43 via the reading device 57. Furthermore, the coding 59 may comprise information on the marking ring 43 by means of which the marking ring 43 may be identified, wherein the mapping rule corresponding to the marking ring 43 may be stored in the memory 37. In this respect, such mapping rules may be stored for a plurality of recognizable marking rings 43 so that, by coupling the respective marking ring 43 to the operating element 21, the mapping rule represented by the marking 45 may be automatically applied without a user having to make further inputs. The reading device 57 may in this respect in particular read the coding through electrical contacting, through magnetic coupling, through electromechanical signal transmission, or through electromechanical conversion.

As FIG. 6 shows, in addition to such a reading device 57 for reading the coding 59, the input device 27 may also be provided, wherein it may be connected to a writing device 61. The reading devices 57 and the writing device 61 may in this respect form a common read/write device, wherein the reading device 57 and the writing device 61 may further also be components of the input device 27. An individual mapping rule may, as described above, be configured by means of the input device 27 and may be written to the memory 47 of the marking ring 43 by means of the writing device 61 by changing or creating the coding. Individual marking rings 43 may thereby be configured, wherein their mapping rule may be directly detected by the reading device 57 on a subsequent coupling to the operating unit 11. To be able to display the individually configured mapping rule or the mapping resulting therefrom of rotational positions of the operating element 21 to set parameter values of the motion picture camera 13, a marking 45 corresponding to this mapping rule may be applied, in particular may be printed and/or adhesively bonded, to the marking ring 43.

However, the coding 59 read from the memory 47 of the marking ring 43 does not necessarily have to represent a mapping rule. Alternatively or additionally, the operating unit 11 may have a or said evaluation and control device 23 and an electronic display device 31 (cf. FIG. 2), wherein the evaluation and control device 23 displays predetermined representation values at the display device 31 that correspond to markings that are applied at a lens ring 16, 18 or 20 of the associated camera lens 49. These representation values (e.g. numerical values and associated position values) may be predetermined by the coding 59 read from the memory 47 of the marking ring 43.

The user may thus also observe the representation values known to him from the respective lens ring 16, 18 or 20 and their position in an almost identical manner at the electronic display device 31 of the operating unit 11 while he varies the respective parameter (e.g. focus distance) by means of the rotatable operating element 21. For this purpose, the predetermined representation values may be automatically, namely solely by coupling the marking ring 43 to the operating unit 11, read in and presented at the display device 31. Optionally, additional information may be coded and presented, e.g. a depth of focus.

In such an embodiment, the evaluation and control device 23 may furthermore be configured to define a variable position of the displayed representation values (e.g. values of the focus distance or aperture) at the display device 31 in dependence on setting values (desired values or actual values) of the camera lens 49 and to take it into account for a presentation variable in time. For this purpose, the operating unit 11 may have a reception device (not shown) to receive position measurement values from the respective lens setting motor 15, 17 or 19.

FIG. 7A again shows a representation of a marking ring 43 that has a memory 47 to which a coding 59 is written. This coding 59 is in this respect contactable via an interface 63 by the reading device 57 of the operating unit 11 when the marking ring 43 is coupled to the operating element 21. To protect the memory 47 from damage by liquids, the memory 47 is at least partly surrounded by a waterproof protective cover 65, wherein the latter has an opening for the interface 63.

The marking 45 of the marking ring 43 in accordance with FIG. 7A corresponds to a scale or values of a set parameter of the motion picture camera 13, e.g. of a focus distance, wherein the marking ring 43 reflects the usual 1/x dependence of the parameter on the rotational position of the operating element 21.

FIG. 7B shows a further marking ring 43 whose marking 45 represents a mapping rule individually configured by means of the input device 27—as explained above. Deviating from the conventional 1/x dependence, a linear relationship between the rotational position of the operating element 21 and the set parameter is in this respect configured for a value range between a first rotational position D1 and a second rotational position D2 of the operating element 21. The conventional 1/x dependence is maintained outside this value range.

Thus, the individual configuration of the mapping rule enables a remote control of the motion picture camera 13 that is ideally adaptable to specific situations, wherein a configuration as shown in FIG. 7B, for example, makes it possible compared to the configuration of FIG. 7A to make precise settings at relatively large values of the parameter between the first rotational position D1 and the second rotational position D2. Furthermore, due to the storing of the mapping rules in the memory 47 of the respective marking ring 43, the mapping rule to be used may furthermore be directly applied on a coupling to an operating unit 11 so that the configured mapping rules may, for example, also be available without problem on a use of rental devices by coupling a respective marking ring 43.

As explained, the coding 59 stored in the memory 47 of the marking ring 43 may alternatively or additionally represent a set of representation values for an electronic presentation of setting values of an associated camera lens 49. These representation values may thus be automatically read in and presented at a display device 31 in a simple and error-proof manner.

Reference Numeral List
- 11 operating unit
- 13 motion picture camera
- 15 first lens setting motor
- 16 first lens ring
- 17 second lens setting motor
- 18 second lens ring
- 19 third lens setting motor
- 20 third lens ring
- 21 operating element
- 23 evaluation and control device
- 23' evaluation and control device
- 25 output device
- 26 reception device
- 27 input device
- 29 base part
- 31 display device
- 33 position encoder
- 35 setting value marking
- 37 memory of the remote control device
- 39 button
- 41 radio receiver
- 43 marking ring
- 45 marking
- 47 memory of the marking ring
- 49 interchangeable lens
- 51 lens ring drive unit
- 53 viewfinder
- 55 camera body
- 57 reading device
- 59 coding
- 61 writing device
- 63 interface
- 65 waterproof protective cover
- 67 slide control
- 69 guide
- 71 coupling device
- 73 display
- 75 holding bar
- 76 signal line
- 77 outer side
- 79 cut-out
- D axis of rotation
- P position signal
- S setting signal

The invention claimed is:

1. A remote control device for a lens setting motor of a motion picture camera, said remote control device comprising an operating unit, wherein the operating unit has
   a base part,
   an operating element rotatable relative to the base part about an axis of rotation for setting control commands for the lens setting motor, and
   a position encoder that is configured to detect a respective rotational position of the operating element relative to the base part and to generate corresponding position signals;

wherein the remote control device has an evaluation and control device that is configured to determine setting signals for the lens setting motor in dependence on the position signals in accordance with a mapping rule;

wherein the mapping rule corresponds to at least one mathematical functional relationship, wherein the remote control device has an input device via which the at least one mathematical functional relationship of the mapping rule can be configured by a user input, and wherein the input device is configured to allow setting, by the user input, a relationship corresponding to a non-linear relationship between values of the position signal and associated values of the setting signal for at least one value range of the position signals or for at least one value range of the setting signals.

2. A remote control device in accordance with claim 1, wherein the input device is configured to allow setting, by the user input, a relationship corresponding to a 1/x function between values of the position signal and associated values of the setting signal (S) for at least one value range of the position signals or for at least one value range of the setting signals.

3. A remote control device in accordance with claim 2, wherein the user input comprises at least one of the following values:

a start value of the at least one value range of the position signals or of the at least one value range of the setting signals; or an end value of the at least one value range of the position signals or of the at least one value range of the setting signals.

4. A remote control device in accordance with claim 1, wherein the input device is configured to allow setting different mathematical functional relationships for different value ranges of the position signal or for different value ranges of the setting signals by the user input.

5. A remote control device in accordance with claim 1, wherein the mapping rule corresponds to a continuous monotonic mathematical function having at least one parameter, wherein the input device is configured to allow setting the at least one parameter by the user input.

6. A remote control device in accordance with claim 1, wherein the input device is configured to allow selecting at least one of the following mathematical functional relationships for the mapping rule by the user input: a power function, a linear function, a polynomial function, a rational function, an exponential function, and/or a logarithmic function.

7. A remote control device in accordance with claim 6, wherein the input device is configured to also allow setting a value range of the position signals or a value range of the setting signals, for applying the selected mathematical functional relationship, by the user input.

8. A remote control device in accordance with claim 1, wherein the input device is configured to allow changing a minimum value of the setting signal and/or a maximum value of the setting signal continuously or quasi-continuously by the user input.

9. A remote control device in accordance with claim 1, wherein the input device is configured to allow setting a respective desired setting signal for a plurality of different rotational positions of the operating element by a respective user input, so that a plurality of pairs of position signals and desired setting signals are defined, wherein the evaluation and control device is configured to determine the mapping rule in accordance with the defined plurality of pairs of position signals and desired setting signals.

10. A remote control device in accordance with claim 1, wherein the evaluation and control device is configured to determine the mapping rule by regression or interpolation from values and/or parameters that are input via the input device.

11. A remote control device in accordance with claim 1, wherein the evaluation and control device is configured to determine the setting signals for the lens setting motor by calculation or by looking up in a look-up table in dependence on the position signals.

12. A remote control device in accordance with claim 1, wherein the input device comprises at least one of the following components: the rotatable operating element; the position encoder; at least one button of the operating unit or of the motion picture camera; a display device of the operating unit or of the motion picture camera; and/or a touch-sensitive display device of the operating unit or of the motion picture camera.

13. A remote control device in accordance with claim 1, wherein the input device comprises a radio receiver for receiving an individual mapping rule from a mobile communication device of a user.

14. A remote control device in accordance with claim 1, wherein the remote control device comprises a marking ring that is configured to be rotationally fixedly coupled to the operating element of the operating unit and that is configured to mark the settable control commands, wherein the input device of the remote control device is configured to read a desired mapping rule from a memory of the coupled marking ring and to transmit the desired mapping rule to the evaluation and control device.

15. A remote control device in accordance with claim 14, wherein the operating unit comprises a writing device that is configured to write a mapping rule stored in the remote control device to the memory of the coupled marking ring.

16. A remote control device in accordance with claim 1, wherein the evaluation and control device is integrated into the operating unit; or wherein the evaluation and control device is formed separately from the operating unit and the operating unit comprises an output device that is configured to transmit the position signals of the position encoder to the evaluation and control device.

17. A remote control device in accordance with claim 1, wherein the setting signal for the lens setting motor represents a value to be set for a focus distance, for an aperture, or for a focal length of a lens of the motion picture camera.

* * * * *